[11] 3,553,503

| [72] | Inventor | Louis R. O'Hare<br>2700 Indiana Ave. NE., Albuquerque, N. Mex. 87110 |
|---|---|---|
| [21] | Appl. No. | 735,504 |
| [22] | Filed | June 5, 1968 |
| [45] | Patented | Jan. 5, 1971 |

[54] GENERATION OF ELECTRICITY
2 Claims, 1 Drawing Fig.

| [52] | U.S. Cl. | 310/11 |
|---|---|---|
| [51] | Int. Cl. | H02n 4/02 |
| [50] | Field of Search | 310/11; 60/202; 103/1M; 73/194(EM) |

[56] References Cited
UNITED STATES PATENTS

| 2,435,043 | 1/1948 | Lehde et al. | 73/194 |
|---|---|---|---|
| 2,583,724 | 1/1952 | Broding | 73/194 |
| 3,122,663 | 2/1964 | Kach | 310/11 |

*Primary Examiner*—David X. Sliney

ABSTRACT: An MHD generator having a linear duct is provided with coaxial coils about the duct, comprising an exciting coil connected to a source of pulsating direct current and a relatively narrow output-load coil at each end of said exciting coil, one of the output coils being located relatively close to the exciting coil.

PATENTED JAN 5 1971
3,553,503
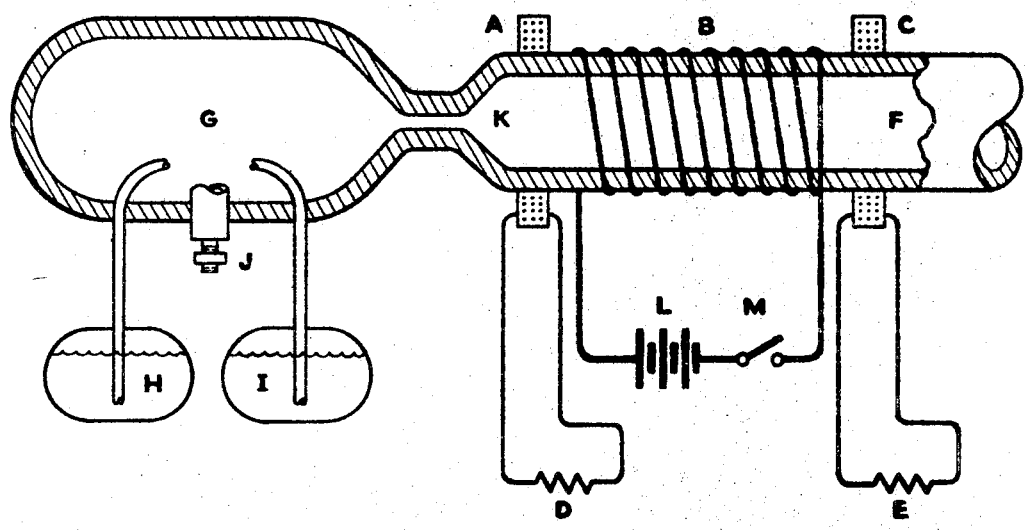
INVENTOR.
BY Louis Richard O'Hare

GENERATION OF ELECTRICITY

My invention employs the energy released from many fuels with their oxidizers, as well as monopropellants of the hydrocarbon or nitrogen type. When these fuels are in the state of combustion or reaction, in which they are giving up energy and reverting to a lower energy state, there is a great deal of energy per unit mass available, especially where nitrogen is reacting to form molecular nitrogen, $n_2$. Fuel cells with elaborate catalysts are one way of extracting electrical energy. Magnetohydrodynamics is another. But until now, extremely high temperatures, as well as electrode deterioration, have impeded this method. My method uses no electrodes, but employs self-augmenting electric and magnetic currents within the streaming gas, and the breaking of fields, to induce electricity.

In the drawing, Coil A is a number of turns of heat resistant insulated wire wound in a circular pattern around Cylinder F. In this coil the number of turns is determined by the amount of voltage desired from the output of this generator. The coil is wound with its windings extending mostly outward, and it occupies very little lengthwise area on the tube.

Coil B. is heavy duty, highly heat resistant insulated wire wound in a circular pattern around Cylinder F. in such a way as to occupy a few inches along the length of the cylinder. This coil is energized by an external source of electricity in such a way that the magnetic polarity of the coil produces a north magnetic pole on the left, with consequent magnetic lines of force extending outward radially on the left hand side of the coil, and magnetic lines of force extending inward radially on the right side of the coil, which is its south pole.

C is exactly like Coil A, but wound very close to Coil B, on the right of B.

D is an electrically resistive load, in which work is to be done by the current induced in Coil A.

E is a similar, but independent and distinct load attached to output winding C.

F is a high temperature heat resistant ceramic cylinder.

G is a ceramic or ceramic-lined combustion chamber similar to a chamber used in a rocket, in which fuels and oxidants or monopropellants may be burned at high temperatures and expelled at high speeds.

H is a pressurized fuel tank containing a solution of an alkali metal salt such as potassium nitrate, which, when injected into combusting gases, causes ionization of the gases and makes them electrically conductive.

I is a pressurized fuel tank containing a monopropellant fuel hydrozine or ethylene oxide or nitromethane.

J is an electric ignitor, glow plug type.

K is a ceramic nozzle.

L is an electric battery or current source.

N is an electric switching device.

When fuel from Tank I flows under pressure onto the ignitor to produce combustion in Chamber G, the alkali metal salt solution from Tank H is also injected. The heat of combustion ionizes the salt and generates electrically conductive ions, which are expelled with great force and speed through Nozzle K, and into Cylinder E. There the streaming and still burning gas breaks across radial magnetic lines of force generated by Coil B and current source L. Since the lines of force to the left of Coil B are extending outward radially, breaking these lines of force by a flowing conductor coming from the left hand side causes a clockwise current flow, as would be seen looking into Cylinder B from the left side. This circular clockwise current flow is analogous to turning on an electric coil within the ceramic tube; therefore, this current flow within the streaming gas may be used to induce a new current in the coil which directly surrounds it, namely Coil A. The same type of action takes place at the other end of the tube, on the right side of Coil B. but here the radial lines of force are extending inward, so the current flow induced in the streaming gas is counter-clockwise, as would be seen looking into the tube from the left side. The stronger the current flow in Coil B, the greater the magnetic lines of force extending radially inward, and the faster and hotter the conductive gas, the stronger is the circular current that can be generated in the streaming gas. Finally, as this circular current builds up, it can induce current in the coil which immediately surrounds it, namely Coil C Switch M is used to engage and disengage Coil B, in order that the circular currents in the gases which are generated by breaking Coil B's lines of force radially might be made to pulsate in strength and thus induce current in Coils A and C,

I claim:

1. A magnetohydrodynamic generator comprising a cylindrical duct through the length of which streams hot ionized gas encircling which duct is an exciter winding which when periodically energized with current of the correct DC polarity produces radial lines of magnetic force extending radially out of the streaming gas on the downstream end of the winding causing an annular current flow in the gas which current flow by producing more and stronger radial lines of force extending in the same outward direction causes an increasing excitation field by which the continuing action of the gas produces stronger annular current the growth of which current is dependent on the energy of the conductive gas whereby a second coil encircling the duct at the downstream end of the first coil is employed by means of magnetic induction to retrieve energy from the annular current flow in the streaming gas, a third coil encircling the duct near the upstream end of the original winding employed in a separate circuit to retrieve induced current from the annular current flow caused in the gas by the gas flowing across radial lines of magnetic force extending radially inward which effect on this upstream end produces an annular current flow in the gas which opposes the current flow in the exciter winding but which nevertheless produces stronger inward moving radial lines of force and an increasing annular current in the gas from which this third coil can extract electric energy.

2. A magnetohydrodynamic generator comprising a cylindrical duct through the length of which streams hot ionized gas encircling which duct is an exciter winding which when periodically energized with current of the correct DC polarity produces radial lines of magnetic force extending radially into the streaming gas on the downstream end of the winding causing an annular current flow in the gas which current flow by producing more and stronger radial lines of force extending inward in the same direction causes an increasing excitation field by which the continuing action of the gas produces stronger annular current the growth of which current is dependent on the energy of the conductive gas whereby a second coil encircling the duct at the downstream end of the first coil is employed by means of magnetic induction to retrieve energy from the annular current flow in the streaming gas, a third coil encircling the duct near the upstream end of the original winding in a separate circuit to retrieve induced current from the annular current flow caused in the gas flowing across radial lines of magnetic force extending radially outward which effect on this upstream end produces an annular current flow in the gas which opposes the current flow in the exciter winding but which nevertheless produces stronger outward moving radial lines of force and an increasing annular current in the gas from which this third coil can extract electrical energy.